Figure 1:
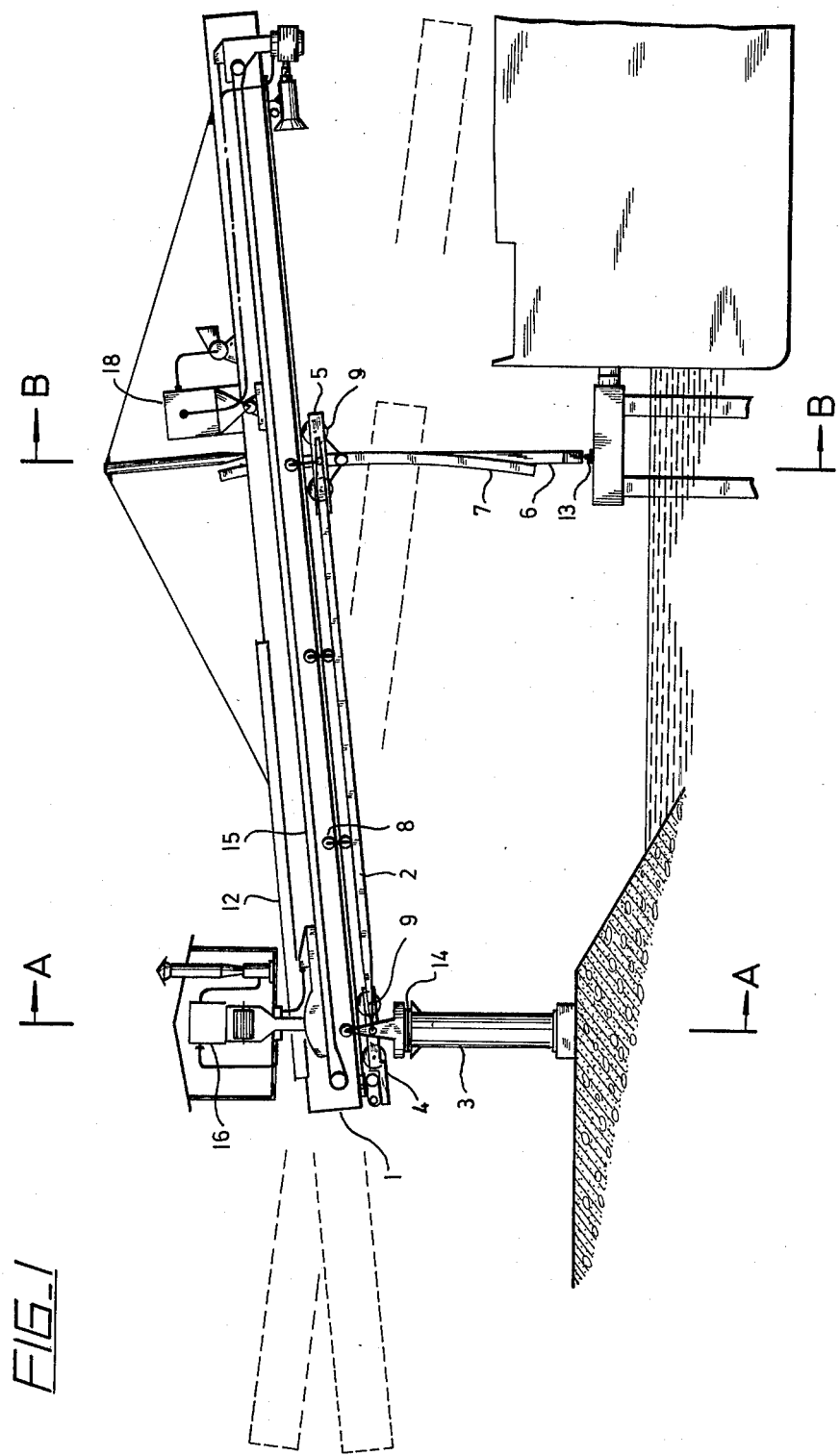

United States Patent [19]

Berthold et al.

[11] 4,082,181
[45] Apr. 4, 1978

[54] SHIP-LOADING INSTALLATION

[76] Inventors: Heinz Berthold, Willi-Gray-Str. 23, D 6672 Rohrbach/Saar; Karl Gehring, Schrappacher Str. 8, D 6672 St. Ingbert/Saar, both of Germany

[21] Appl. No.: 676,651

[22] Filed: Apr. 13, 1976

[30] Foreign Application Priority Data

Apr. 17, 1975 Germany .............................. 2516943

[51] Int. Cl.² ............................................. B65G 21/00
[52] U.S. Cl. .................................... 198/863; 198/591; 214/14
[58] Field of Search ............... 198/863, 861, 578, 587, 198/591, 436, 317, 950; 214/15 A, 15 E, 14

[56] References Cited

U.S. PATENT DOCUMENTS

| | | | |
|---|---|---|---|
| 1,426,706 | 8/1922 | Beattie | 198/317 X |
| 1,515,459 | 11/1924 | Coble | 198/587 X |
| 2,990,942 | 7/1961 | Smith | 198/950 X |
| 3,601,244 | 8/1971 | Ort et al. | 198/587 X |
| 3,856,159 | 12/1974 | Soros | 198/863 X |

FOREIGN PATENT DOCUMENTS 540,405  12/1931  Germany .............................. 214/14

*Primary Examiner*—Evon C. Blunk
*Assistant Examiner*—Douglas D. Watts
*Attorney, Agent, or Firm*—Haseltine, Lake & Waters

[57] ABSTRACT

A column disposed at the center of a circular track carries a first rocker, which is provided with first roller means. An outer support is movable on wheels along said truck and carries a second rocker, which is provided with second roller means. A bridge extends between said column and said outer support and has a length which exceeds the distance between said rockers and comprises an enclosure that extends virtually throughout the length of said bridge and defines therein a peripherally enclosed cavity. Said enclosure comprises a top wall formed with a slot which extends from a point near said column away from the latter and is adapted to be closed by a cover. An endless belt conveyor is arranged in said cavity and adapted to be charged through said slot with material to be loaded. Shifting means are operable to shift said bridge in its longitudinal direction.

4 Claims, 4 Drawing Figures

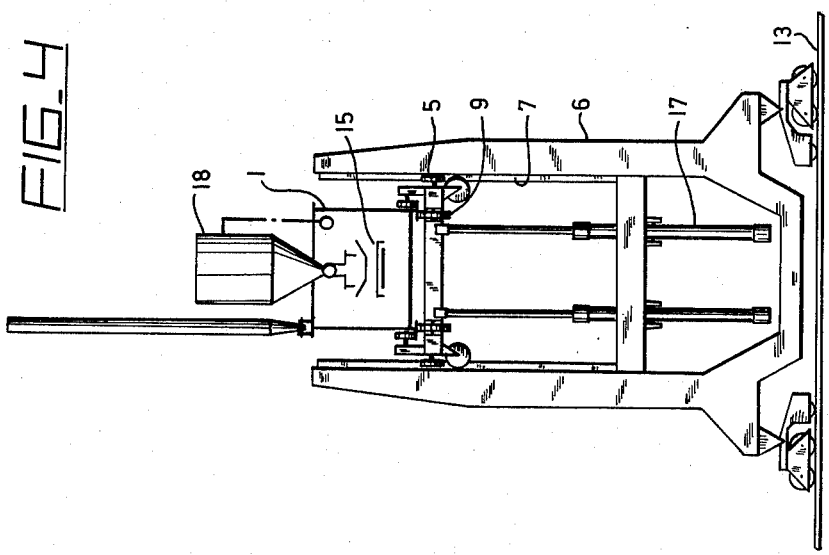
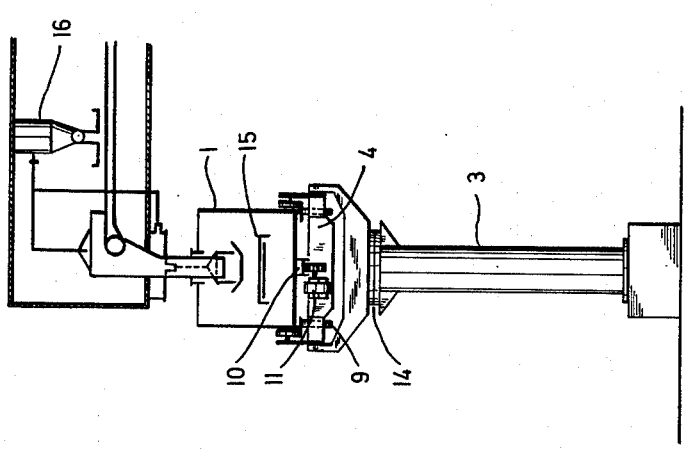

SHIP-LOADING INSTALLATION

This invention relates to a ship-loading installation, which is particularly intended for an ecologically satisfactory loading of dusting bulk materials, comprising a central column, an outer support which is movable on wheels around said central column along a circular track, and a bridge extending between said support and said column and carrying an endless belt conveyor.

Most known ship-loading installations are provided with an extensible and retractable delivery head although this involves difficulty regarding the sealing to prevent an escape of dust. Conventional ship-loading installations either comprise an extensible and retractable delivery head or a stationary belt conveyor which is movable on wheels. In this case, two bridge sections are required, which are movable relative to each other. That arrangement is not satisfactory because it involves wear and a raising of dust. To reduce the raising of dust, movable dust-collecting means must be associated with the extensible and retractable delivery head. In any case, a high structural expenditure is required for a reasonably satisfactory dust collection.

It is an object of the invention to avoid these disadvantages and to provide a ship-loading installation which has no extensible and retractable delivery head and has an improved, simple structure, which is suitable for the difficult task of loading even strongly dusting materials, such as cement and clinker, in an ecologically satisfactory manner.

In a ship-loading installation of the type defined first hereinbefore this object is accomplished according to the invention in that the bridge is pivotally movable in a vertical plane and defines a peripherally enclosed cavity, which extends virtually throughout the length of the bridge and accommodates the belt conveyor; rockers provided with rollers are respectively carried by the central column and the outer support. The distance between the two rockers is smaller than the length of the bridge, which is supported by the rollers of the rockers and is longitudinally movable by shifting means; the cavity which surrounds the conveyor belt is accessible at its top through a slot, which extends from a point near the central column and is adapted to be closed by a cover, and the conveyor is adapted to be charged through said slot with bulk material to be loaded.

In a simple embodiment, the means for shifting the bridge comprise driven pin teeth connected to said bridge and driving pin teeth provided near the central column.

In a preferred arrangement, the movement of the outer support along the circular track is transmitted to the bridge by the rocker carried by the outer support, and the other rocker is rotatably carried by means of the central column by a bearing assembly.

It has also been found desirable to provide drive means, particularly hydraulic drive means, for pivotally moving the bridge in a vertical plane by changing the distance from the track to the rocker carried by the outer support.

In an arrangement which has proved satisfactory in practice, a girder is provided between the rockers, and the rocker carried by the outer support is guided along circular guides mounted on the outer support. The escape of dust will be prevented, or will be at least substantially reduced if a stationary first dust collector is provided near the central column at the charging station for bulk material to be loaded, and if a second dust collector which is movable with the bridge is connected to the latter at that end thereof which is near the outer support.

Figure 2:
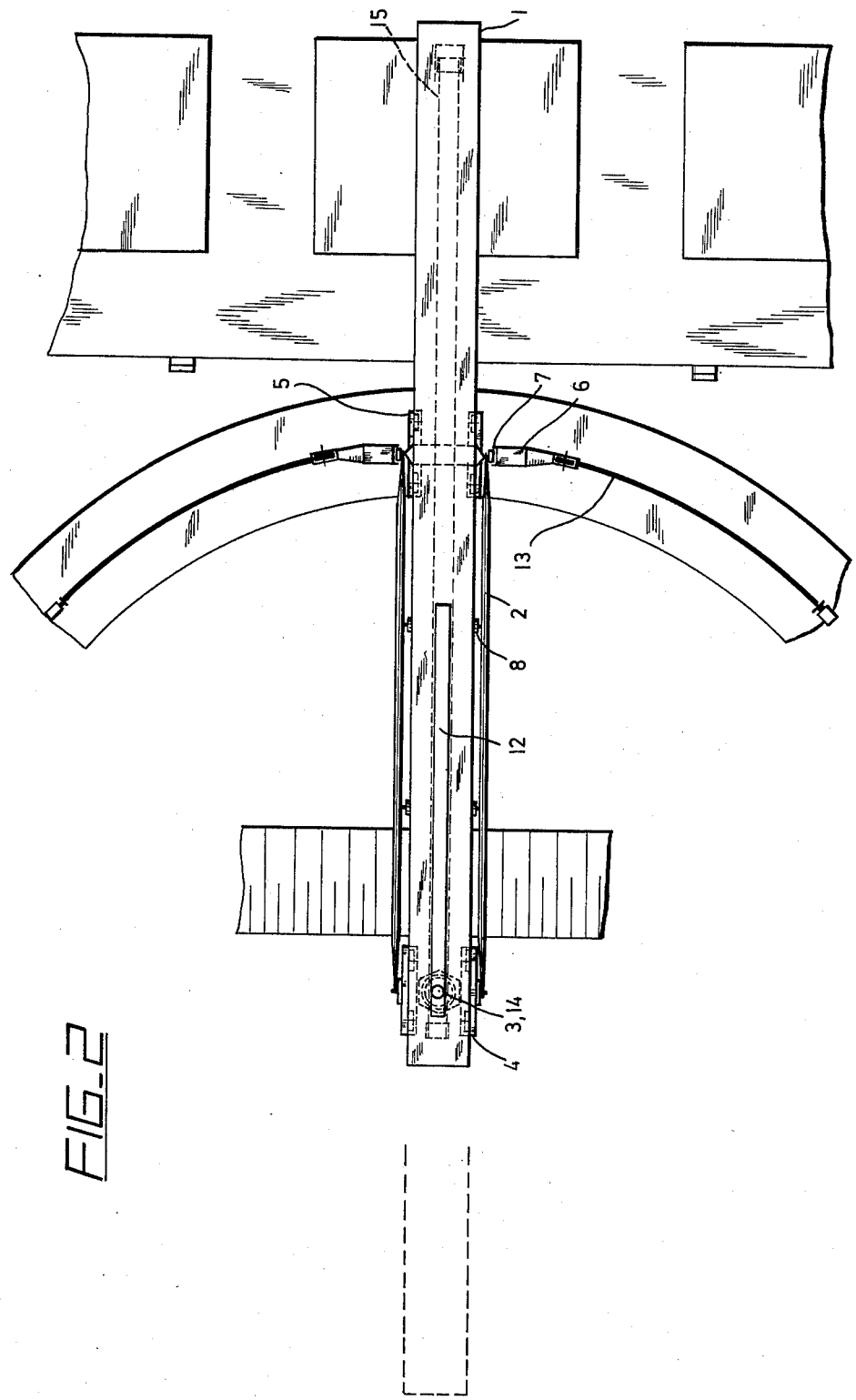

Further advantages and features of the invention will become apparent from the following description of embodiments of the invention shown by way of example on the accompanying diagrammatic drawings in which:

FIG. 1 is a side elevation showing a ship-loading installation according to the invention, FIG. 2 is a top plan view showing the ship-loading installation of FIG. 1, FIG. 3 is a vertical sectional view taken on plane A—A in FIG. 1, and FIG. 4 is a vertical sectional view taken on plane B—B in FIG. 1.

The ship-loading installation which is shown on the drawings comprises a bridge 1, in which a peripherally enclosed cavity extends almost throughout the length of the bridge. An endless belt conveyor 15 is accommodated in said cavity.

The bridge is supported by a girder 2 and is movable in the longitudinal direction of the beam. The beam rests on two rockers 4, 5. The rocker 4 is carried by a central column 3. The other rocker 5 is carried by an outer support 6. The rocker 4 carried by the column rests on a bearing 14, which is mounted on the central column and permits of a pivotal movement of the girder 2 around the axis of the column. Each rocker is provided with rollers 9. Rollers 8 are provided on the top of the girder 2 and support the bridge 1 so that the latter can be reciprocally moved relative to the girder in a longitudinal direction with very small effort. The bridge is shifted by means of a gear drive 11, which comprises a pinion in mesh with a rack 10 that is secured to the underside of the bridge. The gear drive is provided on the rocker 4 which is carried by the column. That rocker is connected to the girder and is pivotally movable about a horizontal axis (FIG. 3). The outer support 6 consists of a frame having two side members connected by lower and upper crosspieces. A truck which is rotatable on a vertical axis is mounted on a lateral projection provided on the outside of each side member near the lower end thereof and comprises wheels which run on a circular track rail 13. The outer support 6 is movable in both directions along said circular track. The rocker 5 associated with the outer support is movable relative to the latter. Circular guides 7 each consisting, e.g., of a channel section or the like are secured to the confronting side faces of the two side members of the outer support. The axes of curvature of the two circular guides coincide and extend horizontally through the bearing assembly 14 for the rocker. That bearing assembly is mounted on the central column 3 and comprises preferably a spherical bearing but may alternatively constitute a Hooke's joint having vertical and horizontal pivots. It is merely essential that the rocker 4 near the column is rotatable on a vertical axis and a horizontal one, which virtually coincides with the axis of curvature of the two circular tracks. Rollers coacting with respective circular guides 7 are mounted on the rocker 5 disposed near the outer support.

The bridge 1 consists of an elongated housing. The configuration of the cross-section of the housing is not essential and may simply be rectangular or square. In any case, the top wall of the housing is provided with a slot 12, which is adapted to be covered by a closure at a point near the central column. The cavity surrounding the conveyor belt is accessible through this slot near the central column 3, so that the bulk material to be loaded can be charged to the belt conveyor through said slot. The slot 12 may extend from that end of the bridge which is near the cloumn, and the length of the slot 12 is at least as large as the distance through which the bridge can be shifted. As a result, the slot extends to the central column, i.e., to the charging station for the material to be loaded, in every position of the bridge relative to the central column. It is essential that the space which contains the moving belt laden with the material is peripherally enclosed.

In the embodiment described, the bridge 1 is carried by a girder 2 so that the bridge may be a relatively light-weight structure. Alternatively, the bridge itself may constitute a self-supporting girder, which is adapted to carry the weight of the belt conveyor and of the material to be conveyed thereby, and may particularly consist of a box girder, which rests on the rollers 8 and 9 of rockers 4 and 5, and is shiftable in its longitudinal direction.

As has been mentioned, the bridge is pivotally movable about the horizontal axis defined by the bearing assembly 14. This pivotal movement may be imparted to the bridge by drive means, particularly hydraulic drive means 17, for lifting and lowering the rocker 5 disposed near the outer support. FIG. 4 shows hydraulic drive means which may consist of one actuator or, as shown, or of two actuators which are connected in parallel and act in the same sense. The cylinders of said actuators are hinged to the upper crosspiece which connects the two side members of the framelike outer support 8. The piston rods protruding from the cylinders are hinged to the rocker 5.

The belt conveyor 15 extends from a charging station, which is disposed near the central column 3, to a discharge station, which is disposed near the outer end of the bridge and serves for the discharge of the material conveyed by the conveyor.

A stationary first dust collector 16 may be provided at the charging station near the central column. A second dust collector 18, which is movable with the bridge 1, may be mounted on the latter near the discharge station. Even when strongly dustcreating and, fine-grained bulk materials are being loaded, these dust collectors will ensure that a raising of dust will be prevented or at least strongly suppressed. The dust collectors 16, 18 may consist of simple exhaust devices.

The ship-loading installation which has been described may be operated, e.g., as follows:

The central column 3 is mounted at a distance from the side of the quay along which the ships to be loaded lie at anchor, the circular track 13 consisting, e.g., of a single rail, is preferably symmetrical with respect to a radius which is at right angles to the side of the quay. The bridge is fully or partly retracted at first, and is pivotally moved to extend approximately in the radial plane which passes through that area to which the material to be loaded is to be conveyed on board of the ship. For this purpose the outer support is moved by conventional drive means, not shown, along the circular track to a suitable position, and the bridge is caused to follow that movement by the rocker 5 secured to the outer support 8, and is thus pivotally moved about the vertical pivotal axis of the bearing assembly 14. The drive means 17 are then operated to lift or lower the rocker 5, which moves along the circular guides 7, whereas the outer support 8 is maintained in its vertical position. The bridge is subsequently extended until its discharge station is disposed over that area to which the material to be loaded is to be conveyed on board of the ship. It will be understood that the positions of the support 8 and/or the rocker 5 may be adjusted as may be required. When the dust collectors have been started, the loading operation may be initiated in that the bulk material to be loaded is charged at the charging station of the bridge onto the moving belt conveyor and is conveyed by the latter to the discharge station of the bridge and at said discharge station is dropped onto the ship. Because that portion of the moving belt conveyor which carries bulk material is disposed in a peripherally completely enclosed space, no dust will be raised during the loading operation even when a wind is blowing so that trails of smoke will not be formed. The absence of raised dust is an important advantage because a loss of material is avoided and also because many dusts, such as cement dust, are deleterious to health and a deposition of dust throughout the environment is not desired. The fact that the moving belt or the load-carrying portion thereof is disposed in a peripherally enclosed cavity will also prevent an ingress of moisture so that even bulk materials which are susceptible to moisture may be loaded during foggy or rainy weather.

What is claimed is:

1. A ship-loading installation, which comprises
a circular track,
a column disposed at the center of said track and carrying a first rocker, which is provided with first roller means,
an outer support movable on wheels along said track and carrying a second rocker, which is provided with second roller means,
a bridge which extends between said column and said outer support and which has a length that exceeds the distance between said rockers, said bridge comprising an enclosure that extends virtually throughout the length of said bridge and defines therein a peripherally enclosed cavity, said enclosure comprising a top wall formed with a longitudinal slot which extends from a point near said column away from the latter,
a closure for selectively closing said slot,
an endless belt conveyor arranged in said cavity, adapted to be charged through said slot with material to be loaded, and to convey bulk material;
shifting means operable to shift said bridge in its longitudinal direction,
said shifting meens comprising driven pin teeth connected to said bridge and driving pin teeth carried by said central column and in mesh with said driven pin teeth.

2. A ship-loading installation, which comprises
a circular track,
a column disposed at the center of said track and carrying a first rocker, which is provided with first roller means,
an outer support movable on wheels along said track and carrying a second rocker, which is provided with second roller means,
a bridge which extends between said column and said outer support and which has a length that exceeds the distance between said rockers, said bridge comprisiing an enclosure that extends virtually throughout the length of said bridge and defines therein a peripherally enclosed cavity, said enclosure comprising a top wall formed with a longitudinal slot which extends from a point near said column away from the latter, a closure for selectively closing said slot, an endless belt conveyor arranged in said cavity and adapted to be charged through said slot with material to be loaded, shifting means operable to shift said bridge in its longitudinal direction; and drive means for changing the distance from said second rocker to said track to impart a pivotal movement to said bridge in a vertical plane, and wherein said outer support comprises circular guide means for guiding said second rocker.

3. A ship-loading installation, which comprises a circular track, a column disposed at the center of said track and carrying a first rocker, which is provided with first roller means, an outer support movable on wheels along said track and carrying a second rocker, which is provided with second roller means, a bridge mounted for pivotal movement in a vertical plane, said bridge extending between said column and said outer support and having a length that exceeds the distance between said rockers, said bridge comprising an enclosure that extends virtually throughout the length of said bridge and defines therein a peripherally enclosed cavity, said enclosure comprising a top wall formed with a longitudinal slot which extends from a point near said column away from the latter, a closure for selectively closing said slot, an endless belt conveyor arranged in said cavity and adapted to be charged through said slot with material to be loaded, and shifting means defined by driven pin teeth connected to said bridge and driving pin teeth carried by said central column and in mesh with said driven pin teeth being operable to shift said bridge in its longitudinal direction in cooperation with said rollers.

4. A ship-loading installation, which comprises a circular track, a column disposed at the center of said track and carrying a first rocker, which is provided with first roller means, an outer support movable on wheels along said track and carrying a second rocker, which is provided with second roller means, a bridge mounted for pivotal movement in a vertical plane, said bridge extending between said column and said outer support and having a length that exceeds the distance between said rockers defined by circular guide means for guiding said second rocker, said bridge comprising an enclosure that extends virtually throughout the length of said bridge and defines therein a peripherally enclosed cavity, said enclosure comprising a top wall formed with a longitudinal slot which extends from a point near said column away from the latter, drive means for changing the distance from said second rocker to said track to impart a pivotal movement to said bridge in a vertical plane, a closure for selectively closing said slot, an endless belt conveyor arranged in said cavity and adapted to be charged through said slot with material to be loaded, shifting means operable to shift said bridge in its longitudinal direction in cooperation with said rollers.

* * * * *